US010053869B2

(12) United States Patent
Krausz (10) Patent No.: US 10,053,869 B2
(45) Date of Patent: Aug. 21, 2018

(54) TILING LAMINATE, PROCESS, AND USE

(71) Applicant: Kablan Developments Inc., Richmond (CA)

(72) Inventor: Gabriel Krausz, Toronto (CA)

(73) Assignee: Kablan Developments Inc., Richmond, British Columbia (CA)

( * ) Notice: Subject to any disclaimer, the term of this patent is extended or adjusted under 35 U.S.C. 154(b) by 0 days.

(21) Appl. No.: 15/428,689

(22) Filed: Feb. 9, 2017

(65) Prior Publication Data
US 2017/0254094 A1    Sep. 7, 2017

Related U.S. Application Data

(60) Provisional application No. 62/303,664, filed on Mar. 4, 2016.

(51) Int. Cl.
*E04F 13/00* (2006.01)
*E04F 15/00* (2006.01)
(Continued)

(52) U.S. Cl.
CPC .......... *E04F 15/02144* (2013.01); *B32B 3/06* (2013.01); *B32B 17/061* (2013.01);
(Continued)

(58) Field of Classification Search
CPC ..... B32B 17/061; B32B 2419/04; B32B 3/06; E04F 15/02144; E04F 15/022;
(Continued)

(56) References Cited

U.S. PATENT DOCUMENTS 3,341,996 A * 9/1967 Jones ................ E04F 15/02144
427/127
5,205,091 A * 4/1993 Brown .................. E04F 15/024
52/126.6
(Continued)

OTHER PUBLICATIONS

"Magnetic Products for Engineering performance, innovation and design", retrieved from http://www.adamsmagnetic.com/flexible-magnets/flexible_magnetic_sheets.php.
(Continued)

*Primary Examiner* — Brian D Mattei
(74) *Attorney, Agent, or Firm* — Kenneth L. Bousfield; Bereskin & Parr LLP/S.E.N.C.R.L., s.r.l.

(57) ABSTRACT

A flooring system combines a dimensionally stabilized sub-floor laminate with a dimensionally stabilized tile laminate, the sub-floor laminate and the tile laminate being held together by magnetic attraction. In one embodiment one or other of the laminates is magnetic, and the other has a ferromagnetic engagement sheet. In another embodiment, a magnetic intermediate sheet is placed between ferromagnetic strata of the two laminates. The tile laminate may include ceramic tiles, which may be glass or porcelain. Those tiles are substantially rigid. They have flat ground edges to provide abutting matching fit with adjacent tiles. On assembly, neither mortar nor grouting is employed. The sub-floor has pre-defined mounting hardware accommodations that permit the fasteners not to interfere with the flatness and fit-up of the laminates.

21 Claims, 4 Drawing Sheets

(51) Int. Cl.
    *E04F 19/00* (2006.01)
    *E04F 15/02* (2006.01)
    *B32B 3/06* (2006.01)
    *B32B 17/06* (2006.01)
    *E04B 5/46* (2006.01)
    *E04F 15/022* (2006.01)
    *E04F 15/04* (2006.01)
    *E04F 15/06* (2006.01)
    *E04F 15/08* (2006.01)

(52) U.S. Cl.
    CPC .............. *E04B 5/46* (2013.01); *E04F 15/022* (2013.01); *E04F 15/041* (2013.01); *E04F 15/06* (2013.01); *E04F 15/082* (2013.01); *B32B 2419/04* (2013.01); *E04F 2201/06* (2013.01)

(58) Field of Classification Search
    CPC ....... E04F 15/041; E04F 15/06; E04F 15/082; E04F 2201/06; E04F 15/02447; E04F 15/02005; E04F 15/02194; E04F 15/105; E04F 15/02405; E04F 15/15; E04F 13/0882; E04F 13/0883; E04B 5/46; F21S 4/00; F21V 33/006
    USPC ...................................................... 52/DIG. 4
    See application file for complete search history.

(56) References Cited

U.S. PATENT DOCUMENTS

| | | | | |
|---|---|---|---|---|
| 5,271,200 A | * | 12/1993 | Witt | A47G 27/0475 52/385 |
| 5,524,373 A | * | 6/1996 | Plumly | G09F 7/04 40/600 |
| 6,247,286 B1 | * | 6/2001 | Heyns | E04C 2/296 52/589.1 |
| 6,367,218 B2 | * | 4/2002 | Lombardo | B44C 1/28 52/311.2 |
| 6,918,217 B2 | | 7/2005 | Jakob-Bamberg et al. | |
| 7,650,726 B2 | | 1/2010 | Jakob-Bamberg et al. | |
| 8,397,411 B2 | * | 3/2013 | Russo | A47G 1/17 248/467 |
| 2003/0221388 A1 | * | 12/2003 | Benedettini | E04F 19/061 52/716.1 |
| 2008/0245008 A1 | * | 10/2008 | Yu | A61N 2/06 52/309.13 |
| 2009/0085251 A1 | | 4/2009 | Brown et al. | |
| 2011/0250434 A1 | * | 10/2011 | Schauer | A47G 27/0437 428/319.7 |
| 2012/0000156 A1 | * | 1/2012 | Esposito | E04F 15/02144 52/309.13 |
| 2013/0212971 A1 | * | 8/2013 | Cordeiro | E04F 13/0894 52/588.1 |
| 2014/0260028 A1 | | 9/2014 | Tuttle et al. | |
| 2014/0283468 A1 | * | 9/2014 | Weitzer | E04F 11/108 52/177 |
| 2015/0233128 A1 | * | 8/2015 | Schauer | E04F 15/043 52/747.1 |
| 2016/0319553 A1 | * | 11/2016 | Lautzenhiser | E04F 13/072 |
| 2017/0058536 A1 | * | 3/2017 | Walens | E04F 15/02447 |

OTHER PUBLICATIONS

Review of the special material supply as retrieved from http://www.casaroma.ca/en/ceramic-stone-tiles/casa-roma/dolphin.

* cited by examiner

TILING LAMINATE, PROCESS, AND USE

CROSS-REFERENCE TO RELATED APPLICATION

This application claims the benefit of US Provisional Application Ser. No. 62/303,664, filed Mar. 4, 2016, entitled 'Tiling Laminate, Process, and Use', the specification and drawings of which are incorporated herein by reference in their entirety.

FIELD OF THE INVENTION

This invention relates to the field of flooring systems.

BACKGROUND OF THE INVENTION

Many kinds of flooring systems are known. In traditional tiling systems, a sub-floor is built on top of a structural base; a mortar material, sometimes termed a thinset, is applied and trowelled; the tiles are laid down; and grouting is applied. Sometimes a membrane is applied over the subfloor, and sometimes a membrane is applied between a first thinset layer and a second thinset layer. All of these are a labour intensive processes. Further, once laid, the tiles cannot be lifted and re-laid, or replaced, without great effort, and removal may tend to mean destruction of the tiles. In the past, it has been known to install porcelain tiles over a sub-floor. The subfloor is, typically, wooden, whether made of plywood (most commonly) or oriented strandboard (OSB). A membrane, typically a polymeric membrane or sheet, is laid over the sub-floor. The tiles are then laid on top of the membrane, then the grouting is applied. The cost of the flooring may be $8/sq.ft., and the cost of the installation may be $5-6/sq.ft.

SUMMARY OF THE INVENTION

In an aspect of the invention there is a flooring system. It has a prefabricated subfloor laminate for mounting to supporting structure, and a prefabricated tile laminate removably mountable thereto. The prefabricated subfloor laminate includes a matrix material and a surface material. The surface material is a first magnetizable material affixed to the matrix. The prefabricated tile laminate includes a surface finish material, and a backing. The backing is a second magnetizable material. One of the first and the second magnetizable materials is magnetic. The prefabricated subfloor laminate and the prefabricated tile laminate are mutually magnetically attractive.

In a feature of that aspect of the invention, the surface finish material is a ceramic material. In a further feature, the ceramic material has ground edges defining abutment interfaces. In a still further feature, the surface finish material is a glass. In a yet further feature, the surface finish material has a textured surface simulating one of (a) a stone material; and (b) a wooden material.

In another feature of that aspect of the invention, the surface material has a thickness of greater than ¼ inch. In another feature, the surface material has a Young's modulus of greater than $1 \times 10^6$ psi. In still another feature, the matrix material has at least one of (a) a through-thickness of greater than 7/16"; and (b) a number of plies greater than 8. In another feature, at least one of the magnetizable materials is a steel sheet. In still another feature, the first magnetizable material has pre-formed fastening accommodations formed therein.

In another aspect of the invention, there is a flooring system that has a prefabricated subfloor laminate for mounting to supporting structure, and a prefabricated tile laminate removably mountable thereto. The prefabricated subfloor laminate includes a matrix material and a surface material. The surface material is a first magnetizable material affixed to the matrix. The prefabricated tile laminate includes a surface finish material, and a backing. The backing is a second magnetizable material. A magnetized intermediate member is provided placement between (i) the surface material of the prefabricated subfloor laminate and (ii) the backing of the prefabricated tile laminate. As assembled, the surface material, the backing and the intermediate member are mutually magnetically attractive.

In a feature of that aspect of the invention, the surface finish material is a ceramic material. In a further feature, the ceramic material has ground edges defining abutment interfaces. In a still further feature, the surface finish material is a glass. In a yet further feature, the surface finish material has a textured surface simulating one of (a) a stone material; and (b) a wooden material.

In another feature of that aspect of the invention, the surface material has a thickness of greater than ¼ inch. In another feature, the surface material has a Young's modulus of greater than $1 \times 10^6$ psi. In still another feature, the matrix material has at least one of (a) a through-thickness of greater than 7/16"; and (b) a number of plies greater than 8. In another feature, at least one of the magnetizable materials is a steel sheet. In still another feature, the first magnetizable material has pre-formed fastening accommodations formed therein.

In still another aspect of the invention there is a floor tile laminate. The floor tile laminate has a ceramic display layer and a magnetizable backing member mounted thereto. The ceramic display layer has ground edges defining finished abutment interfaces for interaction with other such floor tiling laminate of the same type.

In a feature of that aspect of the invention, the ceramic display layer is formed of a glass material. In another feature, the backing member is a steel sheet.

In another aspect of the invention there is a tile laminate. It has a rigid surface stratum and a backing sheet. The rigid surface stratum has a presentation surface. The rigid surface stratum has a concealed mounting face opposed to said presentation surface. The backing sheet is mounted to the concealed mounting face. The backing sheet is substantially co-extensive with the mounting face. The backing sheet is one of (a) a magnetic sheet; and (b) a ferro-magnetic substance for mating engagement with a magnetic sheet.

In a feature of that aspect the rigid surface stratum has a Young's modulus of greater than $1 \times 10^6$ psi. In another feature, the backing sheet is made of a material having a Young's modulus of greater than $1 \times 10^6$ psi. In still another feature, the rigid surface stratum has a thickness of greater than ¼".

In still another feature, the rigid surface stratum has flat ground finished edges. In another feature, the rigid surface stratum includes a glass material.

BRIEF DESCRIPTION OF THE DRAWINGS

These aspects and other features of the invention can be understood with the aid of the following illustrations of a number of exemplary, and non-limiting, embodiments of the principles of the invention in which.

DETAILED DESCRIPTION

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification may be translated, without being limited to specific words or phrases.

The drawings may be taken as being to scale, or generally proportionate, unless indicated otherwise. In the cross-sections, the relative thicknesses of the materials may typically not be to scale, with the thickness of cladding materials typically being substantially exaggerated for the purposes of explanation.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

The terminology used in this specification is thought to be consistent with the customary and ordinary meanings of those terms as they would be understood by a person of ordinary skill in the art in North America. The Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

In this discussion it may be helpful to make reference to a Cartesian co-ordinate system of length, width, and thickness. Many of the materials discussed herein may be supplied in roll form, or in the form of sheets. In general, the direction of unrolling, or the direction of advance of feedstock, may be considered the lengthwise or x-direction. The breadthwise or widthwise dimension of the roll perpendicular to the direction of advance, may be considered the y-direction. The through thickness of the material may be considered the vertical or z-direction. Many of the materials are supplied in a flexible web form in which the through-thickness dimension is small, or very small, as compared to either the running length in the x-direction, or the width in the y-direction.

The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

Figure 1:
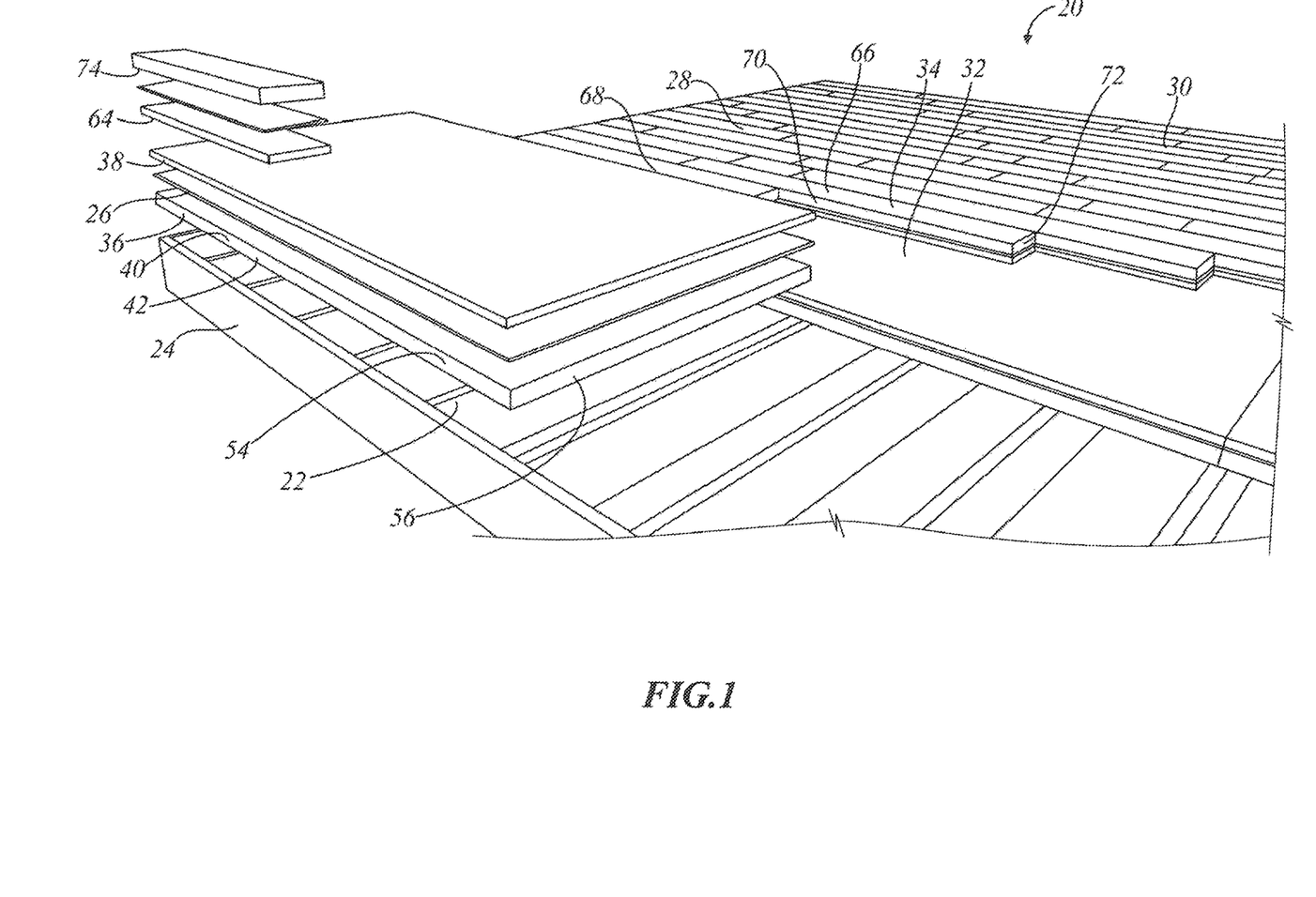
FIG. 1 shows an exploded perspective general arrangement view of framing and flooring structure incorporating an aspect of the present invention.
Figure 2:
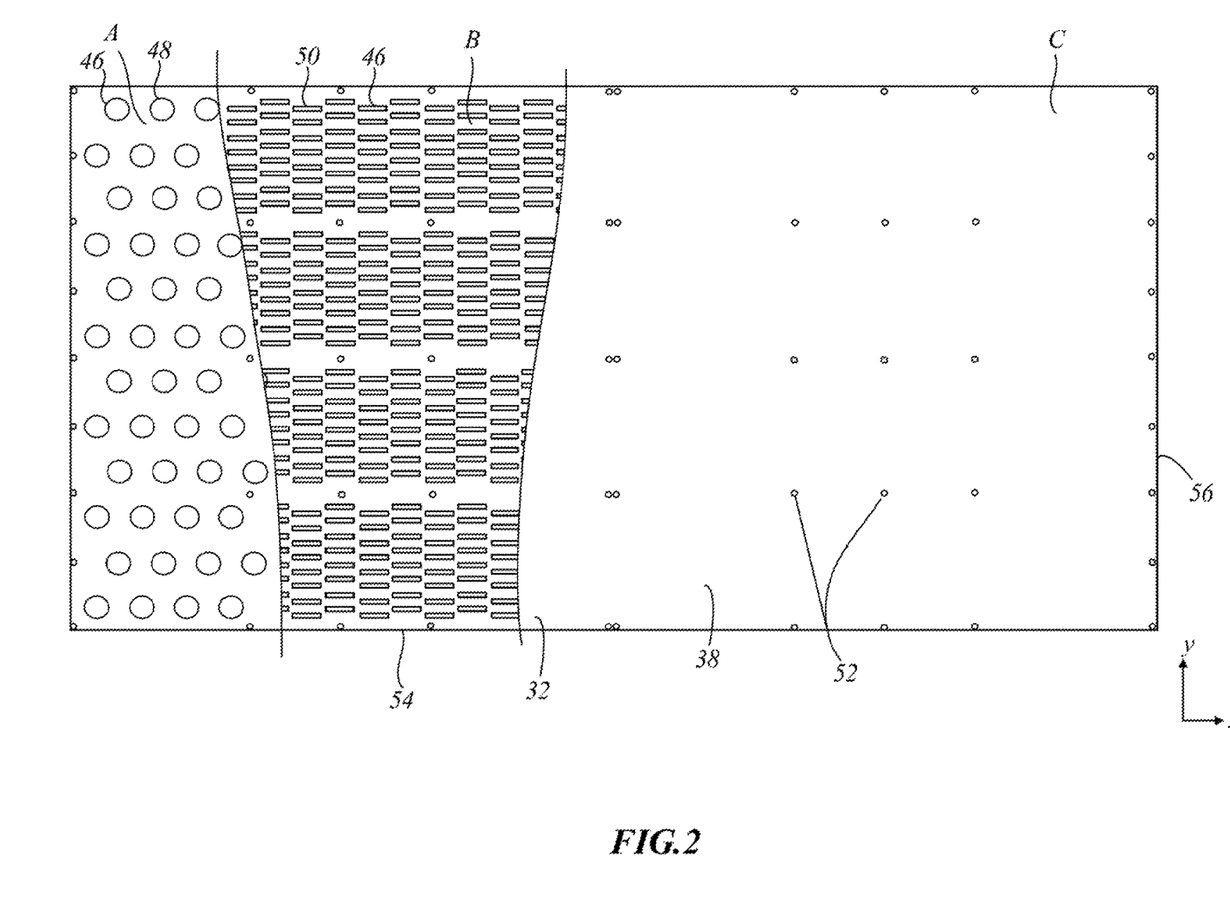
FIG. 2 shows a top view of a sub-floor laminate of FIG. 1.

Referring to FIGS. 1 and 2, a structural assembly is indicated generally as 20. Structural assembly has the form of floor joists 22 carried between headers 24, in the manner of wood frame construction such as is common in North America. While this description is made in the context of flooring, it also has applicability to wall coverings. Such wall coverings may also be mounted to wooden framed walls or to ceilings. Further, while this description is made in the context of wood-framed structures, tiles and laminates as described herein could also be applied to steel floors, or to concrete floor provided with appropriate covering sub-floor materials.

An array 28 of flooring assemblies 30 is applied to the framing structural assembly 20. Each flooring assembly 30 includes a first prefabricated laminate 32 and a second prefabricated laminate 34. Typically there may be several, or many, second prefabricated laminates 34 for each panel of first prefabricated laminate 32.

Figure 3:
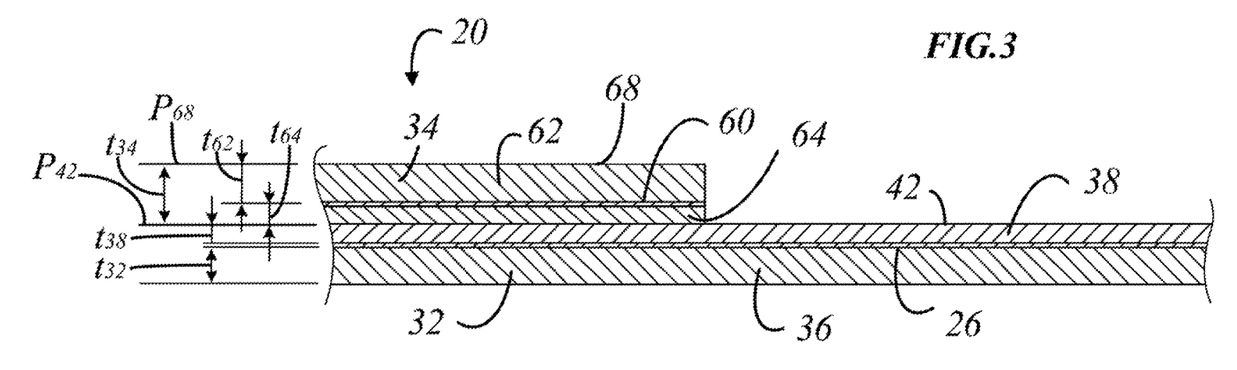
FIG. 3 shows a sectional view of first and second laminates of the flooring structure of FIG. 1.

First prefabricated laminate 32 has a first layer 36 and a second layer 38. First layer 36 is a matrix material 40. The matrix material is a material that has been, or is, substantially dimensionally stabilized. That is to say, it may be an engineered floor panel. Matrix material 40 may typically be a wood product, or wood substrate 42. For example, it may be a high quality multilayered plywood. The plywood may be of greater-than usual thickness. That is, while it may be common to use sub-floor plywood of nominal ½" thickness (actual thickness $^{15}/_{32}$"), wooden substrate 42 may be made of thicker material such as nominal ¾" plywood (actual thickness $^{23}/_{32}$") or greater. Whereas thinner or lower grade plywoods may have as few as 7 layers, the plywood may have greater than 8 layers, and in one embodiment may have at least 10 layers. The layers may be without blemishes, (i.e., free of loose knots) and the plywood may be good-two-sides. It is desirable that the plywood have the same elasticity in the x-direction (long dimension of the sheet) and in the y-direction (cross-wise dimension of the sheet). It is also desirable that the plywood by fully dried to an equilibrium condition, which may typically be to a moisture content of about 10% by weight, or less.

Second layer 38 is a layer that is magnetically participating. As used in this specification the term "magnetically participating" or "magnetizable" means that it is either itself magnetic, or is a material that can become magnetic, or that can be attracted to a magnet. In that context, the most ubiquitous ferromagnetic material is mild sheet steel. To the extent that sheet steel is used, it may also be galvanized. The feedstock of this process may be galvanized steel sheet 42, such as may be provided in rolls. In some embodiments it may be a stainless steel. In some embodiments, the sheet steel may be in the range of 0.0010"-to about 0.040" thick. In one embodiment it may be about 0.030 thick. The sheet may be "good one side", i.e., the top side may be smooth and clear, as in the rightmost portion of FIG. 2. Alternatively, as suggested in the scab illustrations in the leftmost and center portions of FIG. 2, sheet 42 may be perforated, as with perforations 46 which may be round in the leftmost portion, or as at 48 in the center scab portion of FIG. 2, the perforations may be slots as stamped or pierced, as shown at 50. The characteristic width or diameter of such perforations may be less than the through-thickness of second laminate 34 at the edge of the sheet, and may be less than three times that dimension in the body of the sheet. A pierced structure may have prongs as in cleats used in fastening softwood lumber trusses. The perforations may be used to reduce the overall weight of the structure. Where a continuous, non-perforated sheet is used, the sheet may have substantially uniform in-plane physical properties in the x and y directions.

Second layer 38 may be bonded to first layer 36 by an adhesive, or adhesive layer 26. Alternatively, second layer may be a barbed or pronged layer as in WIPO publications WO 13/177667 of Arbesman et al., and WO 13/188951, also of Arbesman et al. The hooks may be quite small. That is, their height from the base web, or skin, may be in the range of 30/1000" to 70/1000", or between 150% and 300% of the thickness of the sheeting generally, with a density of between 30 and 200 pointed structures per square inch, as indicated by Arbesman et al. They define mechanical interlocking members that embed in the softer material. This interconnection may tend not to require lay-up, or vacuum bags, or a curing time in an autoclave.

On assembly, layers 36 and 38 may be mated together, whether for adhesive bonding and curing, or for mechanical inter-attachment. In either case, the laminate may be assembled under dimensionally controlled conditions. That is, in contrast to an in situ application over which there may be little dimensional control, the two layers may be passed through a press, or calendared between rollers to yield a dimensionally uniform, and dimensionally controlled, product. The metal top sheet may then define a flange mounted to the underlying wooden matrix. The matrix member need not necessarily be plywood. It could, for example, be dimensionally stabilized and dried oriented strand board (OSB) or OSB with a good-one-side or good-two-sides surface ply, or plies. It could, alternatively, be an engineered plastic, which may include reinforcing fillers or fibers. However, plywood may typically be convenient.

Additionally, the metal surface layer may be provided with pre-drilled mechanical fastener apertures, or fastening accommodations, as at 52, and such as may also be countersunk. They may be placed on suitable spacings, as for 12", 16", 19.2", and 48" centers. Apertures 52 may provide for multiple alternative standard spacings. It is not necessary that all of apertures 52 by used on assembly. Such apertures may aid in positioning a sheet relative to the underlying joists. Further, however, they may tend to aid in making sure that mechanical fasteners used to mount the sheets to the underlying framing do not stand proud of the metal layer, and to do so without the added effort of driving a screw through a steel sheet, and without local distortion or plastic local deformation of the sheet such as might otherwise occur. It is desirable that mechanical fasteners used for installation be flush or shy of the surface plane so that they do not interfere with the planar engagement of second laminate 34 with first laminate 32. The side edges 54 and end edges 56 of first laminate 32 may be finished edges. That is to say, side edges 54 milled to be square corners and sides and to have close tolerance dimensions to, e.g., a 96"×48" sheet. That is, a typical size of first laminate 32 may be a 4 ft.×8 ft. sheet. Other sizes could be used, e.g., 4 ft×4 ft, or sizes based on 2 ft, 30 in., 32 in. or 36 in wide strips and suitable lengths, 4 ft, 5 ft, 6 ft, 8 ft, 12 ft., etc., as may be, typically of a length corresponding to integer multiples of joist spacing. The metal layer may be of the same milled dimensions, or it may be slightly smaller. If smaller, it may be that the extent by which it is smaller is less than the through-thickness dimension, $t_{34}$, of second laminate 34.

Second laminate 34 may, likewise, have a first layer 62 and a second layer 64 that may be secured to each other with a layer of adhesive 60. Alternatively, where second layer 64 is a cast product, first layer 62 may have mechanical interconnection features that are captured in the cast product. As may be understood, the through thickness of the adhesive layer is exaggerated for the purposes of illustration. First layer 62 is the surface layer, and is the "tile" or "plank" 66. That is, it may be a ceramic, or wood, or wood simulating composite or engineered stone or ceramic that has a first surface 68 that is the display surface of the assembly that will be visible to users of the installed finished parts. In this description, the word "ceramic" may be used to designate tiles that are ceramic or glass or porcelain, or cast stone materials, or manufactured stone or engineered stone, or stone-based, i.e., what would normally be considered hard materials as opposed to a flexible plastic sheet, such as linoleum. Although stone materials, such as slate, may not be true ceramics, in this description they may be considered to fall within "ceramic" as a general term for floor tiles that are hard like stone or glass. In some embodiments first surface 68 may be a textured surface. In other embodiments first surface 68 may be a flat surface. First layer 62 may be a stone or engineered stone material. First layer 62 may be opaque, or it may be a glass or glass-like material of full or partial transparency or translucency. Where it is a glass material, it may be safety (i.e., tempered) glass. The glass may be coloured or it may have a coloured backing. The glass may have beveled edges. Where glass is used, the installation may be for a wall or backsplash, as in a kitchen or washroom. It may also be used in ceiling or floor installations. It may in some cases carry a mirrored or patterned backing. Where it is a glass or glass-like like material, bonding with adhesive may be used in respect of attachment to second layer 64.

Each of the side facing edges 70 (lengthwise), 72 (crosswise) may be finished edges. That is, edges 70, 72 may be ground or milled, as appropriate, to give an abutment face substantially perpendicular to the plane $P_{68}$ of first surface 68. As noted, first surface 68 may be a textured surface that is not, in fact, planar. In this description, $P_{68}$ may be considered to be the mean surface plane, and may be taken as being parallel to the plane of second surface 76. The faces of edges 70, 72 may also be planar. That is, edges 70, 72 could be formed to a curved or toothed shape for interlocking engagement with other pieces of mating shape. However, most typically those faces may be flat for planar abutting engagement of the next adjacent member in the array of tiles. As laminates 34 are prefabricated, the degree of straightness and flatness is subject to close tolerance control at the time of manufacture, under conditions of precision that would be improbable at the location of installation of the end product. In some embodiments, edges 70, 72 may be painted with a very thin coating of plastic resin or sealer. In an alternate embodiment, the edge of the tile may have a two sided tape or polymer of very small thickness—e.g., single or double sided Kapton (t.m.) Polyimide tape, double sided, or merely the 0.0004" thick adhesive layer applied directly to the ceramic.

Second layer 64 is a magnetically participating layer. Again, the manner in which it is mounted to the backside, or underside 76 of the tile member is controlled at the point of manufacture. The tile is generally of high uniformity of thickness, and underside 74 is typically of high uniformity of flatness. The application of adhesive, the mounting of second layer 64, and the curing of the assembly as all subject to process control in a factory setting. Thus the flatness of second layer 64 may correspond to the flatness of layer 38. It may be convenient for layer 64 to be co-extensive with layer 62. This need not be so. Layer 64 may be smaller in each or both of the x and y directions, while remaining substantially co-extensive with the ceramic layer in terms of overall footprint, whether layer 64 is perforated or slotted, or a solid uniform monolith. The extent to which it is smaller at each edge may be less than the thickness of second laminate 34. Layer 64 may tend to be much thinner in through-thickness $t_{64}$ than is layer 62, as shown at $t_{62}$. That is $t_{62}$ may tend to be of the order of ¼" (6 mm) to ½" (13 mm) thick, and may in one embodiment be about 5/16" thick (8 mm) or 3/8" (10 mm) thick. By contrast, layer 64 may be less than 1/16" thick, as at $t_{64}$. It may be about 1.5 mm thick. Layer 64 may be made of sheet metal, such as mild steel sheet or any other ferromagnetic material, as described above in the context of layer 38. Typically, one or the other of layer 64 and layer 38 is magnetic, such that the two layers are mutually attracted. Given that first laminate 32 may tend to be laid before second laminate 34, and may tend to be exposed, at least temporarily to dust and other impurities, it may be convenient for layer 64 to be the magnetic layer. In such case, layer 64 may be made of a polymer impregnated with magnetic particles, such as are commercially available. One supplier of such a product is Adams Magnetic Products Co., of Elizabethtown, Ky. In some embodiments, if desired, both of layers 62 and 64 may be magnetic.

On installation, first laminate 32 is mounted to the underlying framing structure, or to such other structure as may be. Second laminate 34 is then mounted to first laminate 32 by placement and magnetic attraction. To the extent that second laminate 34 is to be repositioned, it may be lifted with suction cups. Given that edges 70, 72 are finished edges, they may tend to fit together with the corresponding edges 70, 72 of the next adjacent tiles in flush, planar abutment. The close fit of milled edges is not intended to require grouting.

To the extent that neither mortar nor grouting may be required, the cost of installation of tiles such as assemblies 30 may tend to be relatively low. It may also be relatively quick, and may not require the curing of chemicals. Furthermore, the use of a magnetic assembly may tend to permit the replacement of parts at a later date that does not tend to require destruction of either the tiling or the surface.

The use of magnetic flooring systems is known. Most typically they pertain to flexible plastic, or vinyl, or linoleum, tiles or sheets that are placed on a substrate. One such assembly is shown in U.S. Pat. No. 3,341,996 of Jones, or U.S. Pat. No. 5,752,357 of Piller, and, latterly, of U.S. Pat. No. 8,656,682 of Williamson. An elastomeric sheet of this nature may have a thickness of less than 1/8", sometimes quite substantially less; and may have a Young's modulus of perhaps 450,000 psi (3 GPa). By contrast a ceramic or ceramic-based tile may have a thickness of 5/16" and a Young's modulus of 10 to $20 \times 10^6$ psi (70-140 GPa). Although the tiles have a modest flex (e.g., 1" over a 72" length), the flexural modulus of the ceramic tile may typically be 200-500 times greater than rollable or peelable tile. It may also tend to have a much lower co-efficient of expansion in the presence of changes in humidity. The thicker, ceramic based tile does not bend or stretch in the manner of a polymer-based tile or roll-supplied sheet flooring. In this specification and the claims herein, the thicker flooring members described herein may be referred to as stiff or rigid members, or non-bending members, in distinction to peelable or rollable flexible polymeric floor coverings. The use of a metal layer on the sub-floor matrix may tend also to cause the subfloor to have an elasticity and flexural modulus that is relatively compatible with the tile. That is, although the galvanized steel sheet may be relatively thin, it has a Young's modulus of $30 \times 106$ psi (210 GPa) and is backed by a thicker matrix. The in-plane stretching of the floor may tend to be dominated by the properties of the galvanized steel sheet, those properties being of a comparable order of magnitude to the properties of the tiles.

Accordingly, given the rather different physical properties, the placement and installation of the thicker, stiffer tiles is a different matter than the placement of soft peelable or rollable tiles or sheets. When the stiff, typically ceramic-based, tiles described herein are laid, their edges mate on a tight seam or interface. That seam may tend to be dimensionally stable. Where tiling is used, either in the context of flooring or of wall members, and the tiling is a ceramic such as a glass or porcelain, a mis-match of dimensions may be visible as a distortion in reflection. This may tend to be reduced by the use of tightly fitting edges and dimensionally controlled components. As compared to conventional ceramic tiling, the use of the magnetic tiling herein may allow the elimination of mis-match in lie caused by the variation of thickness of a mortar, and the need for grouting. Where flat ground edges are mated in abutting contact, the line of contact may tend not to admit entry of a piece of paper. The resultant assembly may appear seamless.

Second laminate 34 may be of many different sizes or aspect ratios. That is, while square tiles may be used, it may be that generally rectangular tiles simulating wood planks may also be used. It is not necessary that all tiles be the same length or the same width. It is, however, expected that even where a variety of tile sizes is used, the cross-wise and length-wise dimensions may nominally yield integer divisions of the sheets panels of first laminate 32. Where the space to be tiled, be it a floor or wall, is not equal to an integer number of first laminates 32 or second laminate 34, or both, as may be, either or both may be cut to size.

Figure 4:
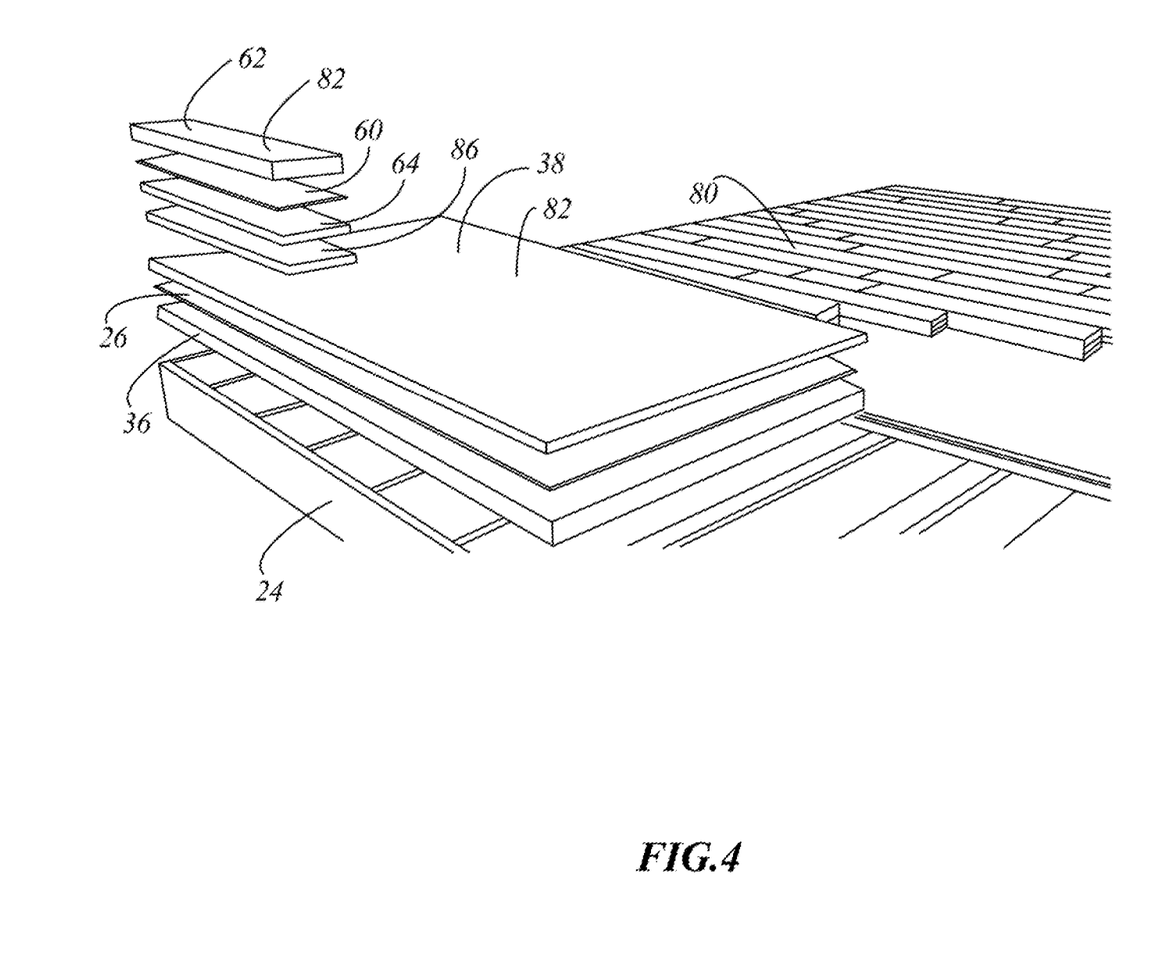
FIG. 4 shows an exploded perspective view of a general arrangement of an alternate, three-part laminate flooring structure to the two part flooring structure of FIG. 1.
Figure 5:
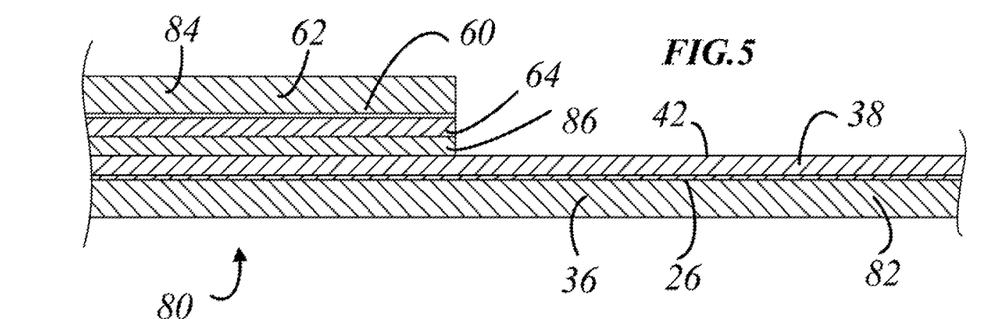
FIG. 5 shows a sectional view of first and second laminates of the flooring structure of FIG. 4.

In a further embodiment as shown in FIG. 4, there is a flooring assembly 80 that is substantially similar to flooring assemblies 30. First laminate 82 may be taken as being the same as first laminate 32. Second laminate 84 may be the same as second laminate 34. Assembly 80 differs from assembly 30 to the extent that neither first laminate 32 nor second laminate 34 need include magnets. They may be passive, e.g., both may have ferromagnetic sheets that are not initially magnetized. Rather, a magnetic sheet 86 is a two-sided magnetic sheet placed between first laminate 82 and second laminate 84, and is attractive to both of them, such that there is a three part, or three layer, assembly or sandwich.

In such an assembly, the magnetic sheet need not be continuous. That is, is could have discrete openings or gaps, or be formed in an array of strips, whether interspersed with non-metallic material or otherwise. The metal backing of the ceramic tile would then function as a tensile reinforcement plane on the back-side of the ceramic sheet.

The tiles are made of a ceramic material, which may be porcelain, with a magnetic layer bonded to the underside of the tile. The magnetic material may be a sheet having many dipole magnets per square foot. The sheet itself may tend to be substantially rubbery, in the manner of a rubber mat. The hold-down force of the sheet may be in the range of 100 lb/sq.ft. The tile may be of a particularly elastic ceramic material such as provided under the product line Casa Roma (t.m.) of Shnier, Gesco LP, of Brampton, Ontario. The tile may be textured tile, and may be supplied in a plank or plank-like form. The magnetic materials may employ rare earth materials, they may be made of grades of steel suitable for magnetization, or they may be, or may include other magnetic materials such as nickel or cobalt.

Although the various embodiments have been illustrated and described herein, the principles of the present invention are not limited to these specific examples which are given by way of illustration, but only by a purposive reading of the claims.

I claim:

1. A flooring system comprising:
a prefabricated subfloor laminate for mounting to supporting structure, and an array of prefabricated tile laminates removably mountable thereto;
said array of tile laminates including a first tile laminate and a second tile laminate;
said prefabricated subfloor laminate including a matrix material and a surface material, said surface material being a first magnetizable material affixed to said matrix material;
each of said first and second prefabricated tile laminates includes a surface finish material, and a backing, said backing being a second magnetizable material;
said surface finish material is a ceramic material; said ceramic material having ground edges defining abutment interfaces; said surface finish material having a Young's modulus of greater than $1\times10^6$ psi;
at least one of said first and said second magnetizable materials being magnetic, and at least one of said first and second magnetizable materials is a steel sheet whereby said prefabricated subfloor laminate and said prefabricated tile laminate are mutually attractive;
on installation, said first tile laminate and said second tile laminate being placed next to each other with their respective ground edges abutting;
said matrix material of said prefabricated subfloor laminate having the same elasticity in x and y directions;
said matrix material of said prefabricated subfloor laminate being one of,
(a) multi-layer, knot-free, good-two-sides plywood of at least 8 layers and a thickness of at least nominal ¾" thickness dried to a moisture content of less than 10%;
(b) dimensionally stabilized and dried oriented strand board having at least one-good-side; and
(c) an engineered plastic having reinforcing fibers;
said surface material of said prefabricated subfloor laminate being a galvanized steel sheet;
said surface finish material of said prefabricated tile laminates is in the range of ¼" to ½" thick; and
said backing of said prefabricated tile laminates is less than 1/16" thick and is magnetic.

2. The flooring system of claim 1 wherein said surface finish material is a glass material.

3. The flooring system of claim 1 wherein said surface finish material has a textured surface simulating one of (a) a stone material; and (b) a wooden material.

4. The flooring system of claim 1 wherein said surface material has a thickness of greater than ¼ inch.

5. The flooring system of claim 1 wherein said matrix material has at least one of (a) a through-thickness of greater than 7/16"; and
(b) a number of layers greater than 8.

6. The flooring system of claim 1 wherein said first magnetizable material has pre-formed fastening accommodations formed therein.

7. A flooring system comprising:
a prefabricated subfloor laminate for mounting to supporting structure, and a prefabricated tile laminate removably mountable thereto;
said prefabricated subfloor laminate including a matrix material and a surface material, said surface material being a first magnetizable material affixed to said matrix;
said prefabricated tile laminate includes a surface finish material, and a backing, said backing being a second magnetizable material;
said surface finish material is a ceramic material, said ceramic material having ground edges defining abutment interfaces;
a magnetized intermediate member for placement between (i) said surface material of said prefabricated subfloor laminate and (ii) said backing of said prefabricated tile laminate;
as assembled, said surface material, said backing and said intermediate member being mutually magnetically attractive;
said matrix material of said prefabricated subfloor laminate having the same elasticity in x and y directions;
said matrix material of said prefabricated subfloor laminate being one of,
(a) multi-layer, knot-free, good-two-sides plywood of at least 8 layers and a thickness of at least nominal ¾" thickness dried to a moisture content of less than 10%;
(b) dimensionally stabilized and dried oriented strand board having at least one-good-side; and
(c) an engineered plastic having reinforcing fibers;
said surface material of said prefabricated subfloor laminate being a galvanized steel sheet;
said surface finish material of said prefabricated tile laminate is in the range of ¼" to ½" thick; and
said backing of said prefabricated tile laminate is less than 1/16" thick.

8. The flooring system of claim 7 wherein said surface finish material is a glass material.

9. The flooring system of claim 7 wherein said surface finish material has a textured surface simulating one of (a) a stone material; and (b) a wooden material.

10. The flooring system of claim 7 wherein said surface material has a thickness of greater than ¼ inch.

11. The flooring system of claim 7 wherein said surface material has a Young's modulus of greater than $1\times10^6$ psi.

12. The flooring system of claim 7 wherein said matrix material has at least one of (a) a through-thickness of greater than 7/16"; and (b) a number of layers greater than 8.

13. The flooring system of claim 7 wherein at least one of said magnetizable materials is a steel sheet.

14. The flooring system of claim 7 wherein said first magnetizable material has pre-formed fastening accommodations formed therein.

15. A floor tile laminate, said floor tile laminate comprising:
a ceramic display layer; and
a magnetizable backing member mounted thereto;
said ceramic display layer having ground edges defining finished abutment interfaces for interaction with other such floor tiling laminate of the same type;

said floor tile laminates fitting together in abutting planar edge contact on installation, in combination with a prefabricated subfloor laminate for mounting to supporting structure, said floor tile laminates being removably mountable to said prefabricated subfloor laminate;

said prefabricated subfloor laminate including a matrix material and a surface material affixed to said matrix material;

said matrix material of said prefabricated subfloor having the same elasticity in x and directions;

said matrix material of said prefabricated subfloor being one of,
(a) multi-layer, knot-free, good-two-sides plywood of at least 8 layers and a thickness of at least nominal ¾" thickness dried to a moisture content of less than 10%;
(b) dimensionally stabilized and dried oriented strand board having at least one-good-side; and
(c) an engineered plastic having reinforcing fibers;

said surface material of said prefabricated subfloor laminate being a galvanized steel sheet;

said ceramic display layer of said tile laminates is in the range of ¼" to ½" thick; and said backing member of said tile laminates is less than ¹⁄₁₆" thick and is magnetic.

16. The floor tile laminate of claim 15 wherein said ceramic display layer is formed of a glass material.

17. The floor tile laminate of claim 15 wherein said backing member is a steel sheet.

18. A magnetic tile laminate comprising:
a rigid surface stratum and a backing sheet;
the rigid surface stratum having a presentation surface;
said rigid surface stratum having a Young's modulus greater than $1 \times 10^6$ psi and a thickness greater than ¼";
the rigid surface stratum having a concealed mounting face opposed to said presentation surface;
said backing sheet being mounted to said concealed mounting face;
said backing sheet being substantially co-extensive with said mounting face;
said backing sheet being one of (a) a magnetic sheet; and (b) a ferro-magnetic substance for mating engagement with a magnetic sheet;
said tile laminates fitting together in abutting planar edge contact on installation, and a prefabricated subfloor laminate for mounting to supporting structure, and said floor tile laminates being removably magnetically mounted to said prefabricated subfloor laminate;
said prefabricated subfloor laminate including a matrix material and a surface material affixed to said matrix material;
said matrix material of said prefabricated subfloor having the same elasticity in x and directions;
said matrix material of said prefabricated subfloor being one of,
(a) multi-layer, knot-free, good-two-sides plywood of at least 8 layers and a thickness of at least nominal ¾" thickness dried to a moisture content of less than 10%;
(b) dimensionally stabilized and dried oriented strand board having at least one-good-side; and
(c) an engineered plastic having reinforcing fibers;

said surface material of said prefabricated subfloor being a galvanized steel sheet;

said rigid surface stratum of said tile laminates is in the range of ¼" to ½" thick; and said backing sheet of said tile laminates is less than ¹⁄₁₆" thick and is magnetic.

19. The tile laminate of claim 18 wherein said backing sheet is made of a material having a Young's modulus of greater than $1 \times 10^6$ psi.

20. The tile laminate of claim 18 wherein said rigid surface stratum has flat ground finished edges.

21. The tile laminate of claim 18 wherein said rigid surface stratum includes a glass material.

* * * * *

UNITED STATES PATENT AND TRADEMARK OFFICE
CERTIFICATE OF CORRECTION

PATENT NO. : 10,053,869 B2
APPLICATION NO. : 15/428689
DATED : August 21, 2018
INVENTOR(S) : Gabriel Krausz Page 1 of 1

It is certified that error appears in the above-identified patent and that said Letters Patent is hereby corrected as shown below:

In the Claims

Claim 15, Column 11, Line 10, "the same elasticity in x and directions" should read -- the same elasticity in x and y directions --

Claim 18, Column 12, Line 15, "the same elasticity in x and directions" should read -- the same elasticity in x and y directions --

Signed and Sealed this
Sixth Day of November, 2018

Andrei Iancu
*Director of the United States Patent and Trademark Office*